United States Patent [19]

Fath et al.

[11] Patent Number: 5,006,173

[45] Date of Patent: Apr. 9, 1991

[54] TRANSFORMING CRUDE COPPER PHTHALOCYANINES INTO A PIGMENTARY STATE

[75] Inventors: Wolfgang Fath, Hirschberg; Rainer Nachtrab, Ludwigshafen; Rudolf Polster, Frankenthal, all of Fed. Rep. of Germany

[73] Assignee: BASF Aktiengesellschaft, Fed. Rep. of Germany

[21] Appl. No.: 370,727

[30] Foreign Application Priority Data

Jul. 15, 1988 [DE] Fed. Rep. of Germany ... 38-24054

[22] Filed: Jun. 23, 1989

[51] Int. Cl.$^5$ .............................................. C09B 67/50
[52] U.S. Cl. .................................... 106/410; 106/412; 106/480
[58] Field of Search .................... 106/410, 412, 480

[56] References Cited

U.S. PATENT DOCUMENTS

| | | | |
|---|---|---|---|
| 3,351,481 | 11/1967 | Hopmeier et al. | 106/410 |
| 3,370,065 | 2/1968 | Nold et al. | 106/410 |
| 3,951,678 | 4/1976 | Wanser | 106/410 |
| 3,985,767 | 10/1976 | Nicaise et al. | 106/410 |
| 4,239,685 | 12/1980 | Pigasse | 106/410 |
| 4,289,698 | 9/1981 | Stepp | 106/410 |
| 4,386,966 | 6/1983 | Fitzgerald | 106/410 |

Primary Examiner—William R. Dixon, Jr.
Assistant Examiner—Willie J. Thompson
Attorney, Agent, or Firm—Keil & Weinkauf

[57] ABSTRACT

Crude copper phthalocyanines are transformed into a pigmentary state by treating finely divided but imperfectly crystallized and highly aggregated crude copper phthalocyanines having a primary particle size, produced by ball milling, or less than 0.1 μm with an organic solvent by subjecting a suspension of the organic solvent and the milled crude copper phthalocyanine (hereinafter referred to as the solvent/pigment suspension), which has a pigment concentration of from 15 to 55% by weight and a solvent concentration of from 15 to 85% by weight and which may contain water in a concentration of from 0 to 30% by weight, to a shear gradient of from 1000 to 20000 s$^{-1}$ for a period of from 2 to 1000 s with an energy uptake during shearing of from 0.01 to 0.02 kWh/kg of pigment throughput, then metering water into the solvent/pigment suspension in an amount of from 0.1 to 10 times the amount of the solvent, to effect a defined discontinuation of the conditioning process, and finally mixing the suspension until homogeneous.

7 Claims, 1 Drawing Sheet

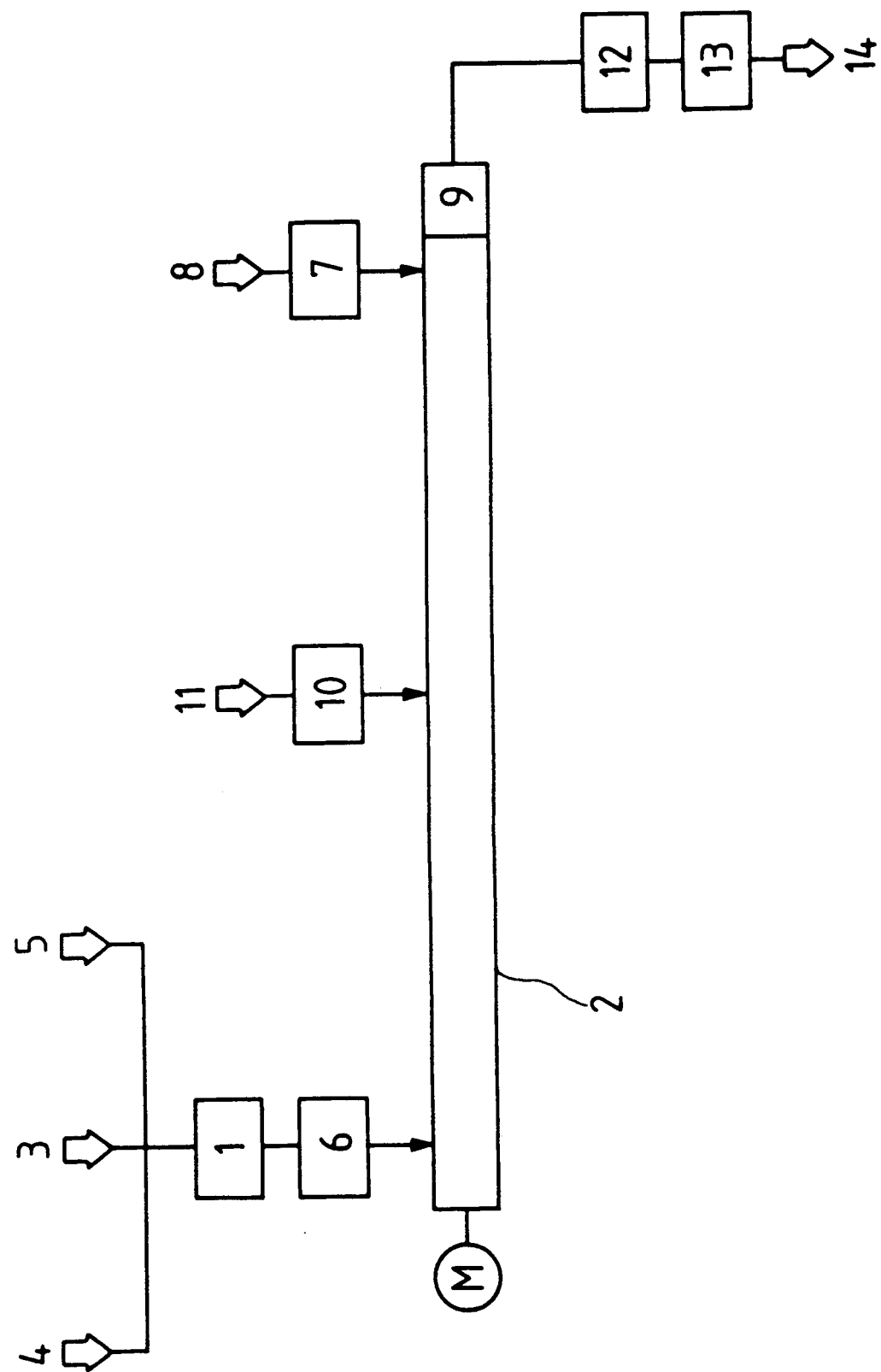

TRANSFORMING CRUDE COPPER PHTHALOCYANINES INTO A PIGMENTARY STATE

The present invention relates to a process for transforming crude copper phthalocyanines into a pigmentary state by treating finely divided but imperfectly crystallized and highly aggregated crude copper phthalocyanines having a primary particle size, produced by ball milling, of less than 0.1 μm with an organic solvent.

Organic pigments are in general obtained from their synthesis in a physical state which is unsuitable for use. These crude pigments have for example a coarse particle size, a nonuniform or unsuitable crystal shape or an excessive aggregation tendency.

Following purification, crude pigments are therefore comminuted, and the residues of starting materials, undesirable by-products and the like are removed. The powders thus obtained, however, have poor coloristic properties on account of a broad particle size spectrum.

The particle size spectrum can be narrowed down by subsequent treatment with organic solvents, whereby it is also possible to adjust other important application parameters, for example particle shape, fluency, dispersibility, color strength, light fastness and weathering fastness, in some instances toward specific values.

There is a prior art where this conditioning of pigments is carried out either batchwise in a stirred kettle, as in Belgian Patent 621,890, or continuously or discontinuously in kneaders with the aid of additives, for example salts, and with or without the inclusion of the comminuting step, as in German Patent 2,336,919.

Conditioning in a stirred kettle requires, because of the long conditioning times (up to several hours) and because of the low pigment concentrations due to the occasionally poor fluency, large apparatus capacities and solvent quantities which are difficult to handle safely from an environmental standpoint. Moreover, the batchwise process makes it difficult to guarantee consistent product quality.

The discontinuous or continuous conditioning in kneaders or screw machines with the aid of salts may present environmental problems owing to the large amount of salt used, but always requires large apparatus capacities on account of the large amount of salt and on account of long residence times.

It is an object of the present invention to provide a conditioning process for crude copper phthalocyanines which, without aids such as salts and by means of smaller apparatus capacities, supplies a pigment which has or even exceeds the abovementioned properties of conventionally conditioned pigments.

We have found that this object is achieved according to the invention by subjecting a suspension of the organic solvent and the milled crude copper phthalocyanine (hereinafter referred to as the solvent/pigment suspension), which has a pigment concentration of from 15 to 55% by weight and a solvent concentration of from 15 to 85% by weight and which may contain water in a concentration of from 0 to 30% by weight, to a shear gradient of from 1000 to 20000 $s^{-1}$ for a period of from 2 to 1000 s with an energy uptake during shearing of from 0.01 to 0.2 kWh/kg of pigment throughput, then metering water into the solvent/pigment suspension in an amount of from 0.1 to 10 times the amount of the solvent, to effect a defined discontinuation of the conditioning process, and finally mixing the suspension until homogeneous.

Further features of the process according to the invention form the subject-matter of subclaims.

Apparatus of advantageous usefulness for the process according to the present invention is shown in the process flow diagram of the drawing.

A metering means 1 is used to supply to a screw machine 2, for example to a modified single- or twin-screw machine as used in the plastics industry, either separately or together with milled crude pigment, either as a dry powder or as a water-moist filtercake 3, tetrahydrofuran 4 and if necessary water 5 in a continuous manner. Depending on the flow properties of the resulting suspension and the construction of the screw machine, it is necessary to position between the metering means and the screw machine a forced feed system 6 which transports the suspension through the screw machine. Customary machines for this purpose are eccentric screw pumps and closely intermeshing contra-rotating twin screws.

The screw machine 2 comprises a plurality of housing elements which are separately thermostatically controllable. The screw shaft is equipped with various screw elements for conveying and shearing elements. The shearing elements can be realized for example as rotor-stator systems or kneading elements of the type customary in plastics processing. On leaving the shearing zone, the suspension is diluted via the metering means 7 with water 8 and homogenized in a mixing means 9. This mixing means can take the form of a shearing element as described above and be situated inside the screw machine. In this case the water is added via a hole in the housing. If necessary, it is possible to use the individual metering means 10 and holes in the housing wall to add assistants and coating agents 11 during shearing.

On leaving the mixing means, the suspension passes into a purification stage 12 or directly into a drying stage 13, depending on whether a crude pigment or a purified crude pigment was used at 1. If no purification is required, it is possible in certain circumstances to use the metering means 7 to adjust the consistency of the suspension in such a way that it is possible to use as the dryer a fluidized bed, belt or spray dryer.

The resulting pigments 14 are about 10% stronger in color strength than those produced in a batch process and have very pure and transparent hues.

EXAMPLES 1. 20 kg/h of Cu phthalocyanine (purified, crystal form: α content 40%) which has been dried by ball milling are introduced together with 26 kg/h of tetrahydrofuran and 6.5 kg/h of water into a screw machine and sheared at a maximum shear gradient of 7000 $s^{-1}$ for 44 s, thereafter 42 kg/h of water are mixed in, and the resulting suspension is dried at 80° C. The result obtained is a qualitatively high-grade pigment in the β-crystal form for offset printing which has excellent coloristic properties.

2. 14 kg/h of milled Cu phthalocyanine (not purified, α content 60%) are introduced together with 26 kg/h of an azeotropic mixture of tetrahydrofuran and water into a screw machine and sheared at a maximum shear gradient of 6800 $s^{-1}$ for 65 s, thereafter 132 kg/h of water are added, and the Cu phthalocyanine is filtered off and dried. The result obtained is a qualitatively high-grade pigment in the β-crystal form for offset printing which has excellent coloristic properties.

3. 26.5 kg/h of water-moist filtercake of milled Cu phthalocyanine (purified, α content 60%) having a solids content of 62% are sheared together with 23.8 kg/h of an azeotropic mixture of tetrahydrofuran and water at a shear gradient of 6800 s$^{-1}$ for 52 s. Thereafter 136 kg/h of water are added, and the suspension is dried. The result obtained is a qualitatively high-grade pigment in the β-crystal form for offset printing which has excellent coloristic properties.

4. Like Example 3, except only 32.5 kg/h of water and not 136 kg/h of water are added. The result is a non-fluent paste, unlike the mobile suspension of Example 3. The coloristic properties are similar to those of Example 3.

We claim:

1. A process which comprises subjecting a suspension of the (organic solvent) and the milled crude (copper phthalocyanine) (hereinafter referred to as the solvent-/pigment suspension), which has a pigment concentration of from 15 to 55% by weight and a solvent concentration of from 15 to 85% by weight and which may contain water in a concentration of from 0 to 30% by weight, to a shear gradient of from 1000 to 20000 s$^{-1}$ for a period of from 2 to 1000 s with an energy uptake during shearing of from 0.01 to 0.2 kWh/kg of pigment throughput, then metering water into the solvent/pigment suspension in an amount of from 0.1 to 10 times the amount of the solvent, to effect a defined discontinuation of the conditioning process, and finally mixing the suspension until homogeneous.

2. A process as claimed in claim 1, wherein the organic solvent used is (tetrahydrofuran).

3. A process as claimed claim 1, wherein the shear gradient in the shearing is from 5000 to 16000 s$^{-1}$.

4. A process as claimed claim 1, wherein the pigment concentration in the suspension is from 18 to 45% by weight.

5. A process as claimed in claim 1, wherein the residence time in the shearing zone is from 5 to 500 s.

6. A process as claimed in claim 1, wherein the amount of water metered in after the suspension has been sheared is from 0 to 10 times, from 0.2 to 5 times, of the amount of solvent present in the suspension.

7. A process as claimed in claim 1, wherein the energy taken up by the suspension during shearing is from 0.02 to 0.12 kWh/kg of pigment throughput.

* * * * *

UNITED STATES PATENT AND TRADEMARK OFFICE
CERTIFICATE OF CORRECTION

PATENT NO. : 5,006,173
DATED : Apr. 9, 1991
INVENTOR(S) : Wolfgang FATH et al.

It is certified that error appears in the above-identified patent and that said Letters Patent is hereby corrected as shown below:

<u>In Claim 6, Col. 4, line 19:</u>

Please delete "from 0 to 10 times,"

Signed and Sealed this

Eighth Day of September, 1992

Attest:

DOUGLAS B. COMER

*Attesting Officer*     Acting Commissioner of Patents and Trademarks